United States Patent
Kurita

(10) Patent No.: US 10,478,752 B2
(45) Date of Patent: Nov. 19, 2019

(54) CHEMICAL LIQUID TANK

(71) Applicant: TOSHIBA MEMORY CORPORATION, Tokyo (JP)

(72) Inventor: Masato Kurita, Mie (JP)

(73) Assignee: Toshiba Memory Corporation, Tokyo (JP)

( * ) Notice: Subject to any disclaimer, the term of this patent is extended or adjusted under 35 U.S.C. 154(b) by 730 days.

(21) Appl. No.: 15/065,189

(22) Filed: Mar. 9, 2016

(65) Prior Publication Data

US 2017/0074712 A1 Mar. 16, 2017

(30) Foreign Application Priority Data

Sep. 11, 2015 (JP) .................................. 2015-179869

(51) Int. Cl.
*B01D 19/00* (2006.01)
*G05D 9/12* (2006.01)

(52) U.S. Cl.
CPC ......... *B01D 19/00* (2013.01); *B01D 19/0005* (2013.01); *G05D 9/12* (2013.01)

(58) Field of Classification Search
CPC ........ G01F 23/296; G05D 11/00; G05D 9/12; B01D 19/00; B01D 19/0005; B01L 3/00; B05C 11/10
See application file for complete search history.

(56) References Cited

U.S. PATENT DOCUMENTS

| | | | | |
|---|---|---|---|---|
| 4,248,087 A * | 2/1981 | Dennis | ............... | G01F 23/2962 340/621 |
| 6,457,852 B1 | 10/2002 | Hiraoka et al. | | |
| 7,105,044 B2 * | 9/2006 | Konishi | ................... | F15B 1/26 210/188 |
| 7,168,191 B2 * | 1/2007 | Chikaishi | ............... | E02F 3/325 37/347 |
| 7,419,946 B2 * | 9/2008 | Hiraoka | .................. | B24B 37/04 438/692 |
| 7,863,195 B2 * | 1/2011 | Hiraoka | .................. | B24B 37/04 438/692 |
| 8,739,822 B2 * | 6/2014 | Uenishi | ................. | F15B 21/047 137/171 |
| 9,121,745 B2 * | 9/2015 | Beyer | ................. | G01F 23/2962 |
| 2003/0233942 A1 * | 12/2003 | Konishi | ................... | F15B 1/26 96/208 |
| 2005/0142883 A1 * | 6/2005 | Hiraoka | ................. | B01F 3/088 438/692 |

(Continued)

FOREIGN PATENT DOCUMENTS

DE 102008017070 A1 * 10/2009 ......... G01F 23/2962
JP S50-102374 U 8/1975

(Continued)

*Primary Examiner* — Isam A Alsomiri
*Assistant Examiner* — Amie M Ndure
(74) *Attorney, Agent, or Firm* — Finnegan, Henderson, Farabow, Garrett & Dunner, L.L.P.

(57) ABSTRACT

A chemical liquid tank has a container to store chemical liquid, a sensor to measure a height of a liquid surface by irradiating the chemical liquid stored in the container with an ultrasonic wave and measuring time until a reflected wave reflected from the liquid surface of the chemical liquid is received, and a gas jetting port to spray a gas toward a part of the liquid surface comprising an irradiation position of the ultrasonic wave in the container.

8 Claims, 3 Drawing Sheets

(56) References Cited

U.S. PATENT DOCUMENTS

| | | |
|---|---|---|
| 2007/0175496 A1 | 8/2007 | Rattray |
| 2012/0060873 A1* | 3/2012 | Akutsu ................ G01N 29/032 134/184 |
| 2012/0152015 A1* | 6/2012 | Beyer ................... G01F 23/296 73/290 V |
| 2012/0174650 A1* | 7/2012 | Ariessohn ................ B08B 3/12 73/23.2 |

FOREIGN PATENT DOCUMENTS

| | | | |
|---|---|---|---|
| JP | 61205821 A | * | 9/1986 |
| JP | 08267027 A | * | 10/1996 |
| JP | 9-164374 | | 6/1997 |
| JP | H11-126764 A | | 5/1999 |
| JP | 2004-273830 | | 9/2004 |

* cited by examiner

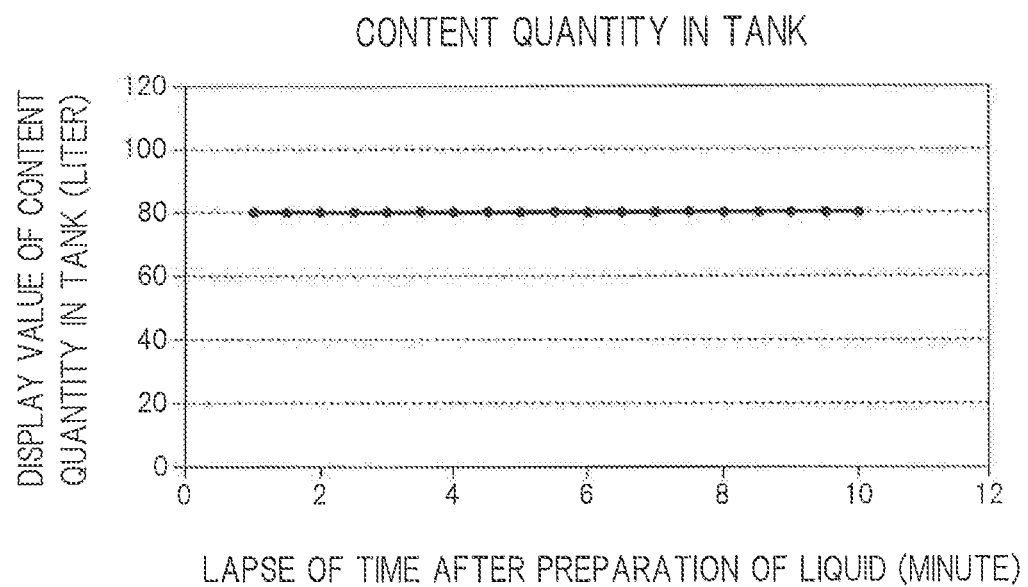
F I G. 3A
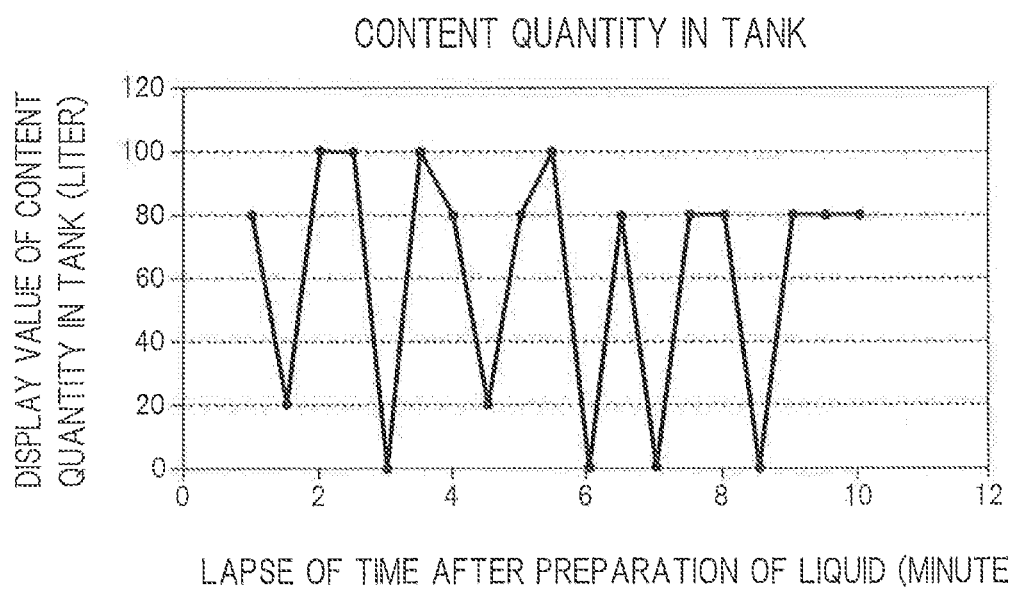
F I G. 3B

CHEMICAL LIQUID TANK

CROSS REFERENCE TO RELATED APPLICATIONS

This application is based upon and claims the benefit of priority from the prior Japanese Patent Application No. 2015-179869, filed on Sep. 11, 2015, the entire contents of which are incorporated herein by reference.

FIELD

The present invention relates to a chemical liquid tank.

BACKGROUND

In a semiconductor manufacturing apparatus, a washing process is performed using various types of chemical liquid after the wafer processing process. Many types of chemical liquid include a material with which bubbles are easily generated, such as surfactant. The chemical liquid is prepared by mixing chemical liquid and pure water in a preparation tank to attain a desired concentration. At this time, some chemical liquid may generate a large amount of bubbles.

The height of a liquid surface of the chemical liquid in the preparation tank is often measured by an ultrasonic sensor. In accordance with the result of measurement by the sensor, the volume of the chemical liquid and pure water to be supplied to the preparation tank is controlled.

However, if bubbles are generated in the preparation tank, the sensor may recognize the liquid level incorrectly. Specifically, when the ultrasonic wave ejected from the sensor is reflected from the bubbles, the reflected ultrasonic wave is received by the sensor in shorter time than from the actual liquid surface. The sensor, therefore, incorrectly recognizes that the liquid surface is higher than the actual liquid surface. Alternatively, the ultrasonic wave from the sensor may transmit through and be attenuated by the bubbles, and thus the sensor may be unable to receive the ultrasonic wave or may take very long time before receiving the ultrasonic wave. In this case, the sensor recognizes incorrectly that the preparation tank is empty.

It is, therefore, difficult to accurately measure the liquid surface of the chemical liquid in the preparation tank when bubbles are easily generated in the chemical liquid.

Similar problem may occur in a supply tank that stores the chemical liquid from the preparation tank and supplies the chemical liquid to a semiconductor manufacturing apparatus.

BRIEF DESCRIPTION OF THE DRAWINGS

FIG. 3A is a graph plotting the volume of chemical liquid in a container that changes over time according to the embodiment; and FIG. 3B is a graph plotting the volume of chemical liquid in a container that changes over time according to a comparative example.

DETAILED DESCRIPTION

According to one embodiment, a chemical liquid tank has a container to store chemical liquid, a sensor to measure a height of a liquid surface by irradiating the chemical liquid stored in the container with an ultrasonic wave and measuring time until a reflected wave reflected from the liquid surface of the chemical liquid is received, and a gas jetting port to spray a gas toward a part of the liquid surface comprising an irradiation position of the ultrasonic wave in the container.

Hereafter, an embodiment of the present invention will be described with reference to the accompanying drawings.

Figure 1:
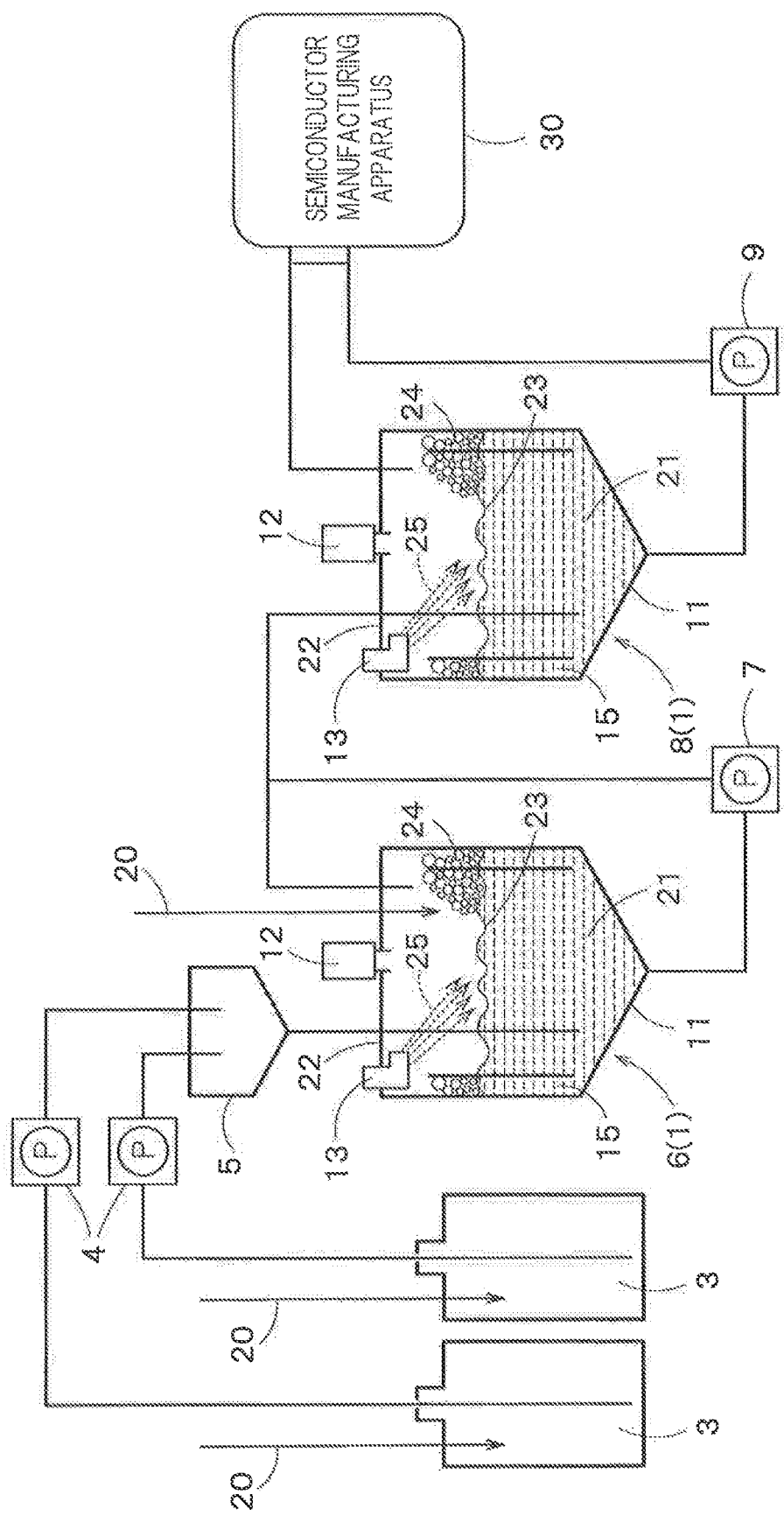
FIG. 1 is a schematic diagram illustrating a chemical liquid supplying apparatus including a chemical liquid tank according to an embodiment.

FIG. 1 is a schematic diagram illustrating a chemical liquid supplying apparatus 2 including a chemical liquid tank 1 according to an embodiment. The chemical liquid supplying apparatus 2 illustrated in FIG. 1 supplies chemical liquid, for example, to a semiconductor manufacturing apparatus 30 for the washing purpose. The chemical liquid is not limited to be supplied to the semiconductor manufacturing apparatus 30 from the chemical liquid supplying apparatus 2. The type of the chemical liquid is not limited, either.

The chemical liquid supplying apparatus 2 of FIG. 1 includes at least one type of raw liquid bottles 3, a first pump 4, a weighing tank 5, a preparation tank 6, a second pump 7, a supply tank 8, and a third pump 9.

The raw liquid bottle 3 stores raw chemical liquid in a chemical resistant container. An appropriate volume of pure water 20 is supplied to the raw liquid bottle 3, as needed. The number of raw liquid bottles 3 is not particularly limited.

The first pump 4 transfers the raw liquid from the raw liquid bottle 3 to the weighing tank 5. The weighing tank 5 measures weight of the raw liquid that has been transferred from the raw liquid bottle 3. The raw material stored in the weighing tank 5 is transferred to the preparation tank 6.

In the preparation tank 6, the raw liquid from the weighing tank 5 is mixed with pure water 20 to generate chemical liquid 21. The second pump 7 is disposed at a discharge port of the preparation tank 6. The second pump 7 regularly performs a circulating operation of discharging and returning the chemical liquid 21 from and to the preparation tank 6, in order to attain an approximately uniform concentration of the chemical liquid 21 in the preparation tank 6.

A valve, which is not illustrated, is provided between the preparation tank 6 and the supply tank 8. When this valve is open, the chemical liquid 21 in the preparation tank 6 is transferred to the supply tank 8. The third pump 9 is disposed at the discharge port of the supply tank 8. The third pump 9 regularly performs a circulating operation of discharging and returning the chemical liquid 21 from and to the supply tank 8, in order to attain an approximately uniform concentration of the chemical liquid 21 in the supply tank 8.

The preparation tank 6 and the supply tank 8 correspond to a chemical liquid tank 1 of the present embodiment. Both the preparation tank 6 and the supply tank 8 individually include a container 11, a sensor 12, and a gas jetting port 13. Since the preparation tank 6 and the supply tank 8 have an approximately the same structure, the preparation tank 6 will mainly be described below as a representative.

The sensor 12 and the gas jetting port 13 are disposed at different locations of, for example, an upper lid 22 of the container 11 of the preparation tank 6. The sensor 12 measures the height of a liquid surface 23 of the chemical liquid 21 in the preparation tank 6 and is disposed, for example, near the center part of the upper lid 22. The sensor 12 irradiates the liquid surface 23 with an ultrasonic wave approximately in parallel with the normal direction of the liquid surface 23 of the chemical liquid 21 in the container 11. The height of the liquid surface 23 is measured by the sensor 12 according to the time between the irradiation of the ultrasonic wave and the reception of a reflected wave reflected by the liquid surface 23. When the height of the liquid surface 23 reaches a predetermined upper limit, the transfer of the chemical liquid 21 from the weighing tank 5 to the container 11 is stopped. When the height of the liquid surface 23 reaches a predetermined lower limit, the transfer of the chemical liquid 21 from the weighing tank 5 to the container 11 is started.

Meanwhile, in the supply tank 8, when the sensor 12, which has been similarly disposed on the upper lid 22, detects that the height of the liquid surface 23 of the chemical liquid 21 reaches the upper limit, the transfer of the chemical liquid 21 from the preparation tank 6 to the supply tank 8 is stopped. When the sensor 12 detects that the height of the liquid surface 23 reaches the lower limit, the transfer of the chemical liquid 21 from the preparation tank 6 to the supply tank 8 is started.

The gas jetting port 13 of the preparation tank 6 jets a gas 25 toward a part of the liquid surface 23 including the irradiation position of the ultrasonic wave and an area around the irradiation position in the preparation tank 6. By jetting the gas 25 over the liquid surface 23, bubbles 24 located in the part of the liquid surface 23 are moved away from the irradiation position of the ultrasonic wave. When the sensor 12 irradiates the liquid surface 23 with the ultrasonic wave in this state to measure the height of the liquid surface 23, the height of the liquid surface 23 is accurately measured without much influence from the bubbles 24. It is desirable that the gas jetting port 13 sets arbitrarily at least one of a pressure of the gas to be jetted, jetting time, or a jetting angle.

The gas 25 is not necessarily jetted continuously from the gas jetting port 13, but it is desirable that the jetting of the gas 25 continues while the sensor 12 measures the height of the liquid surface 23.

Figure 2:
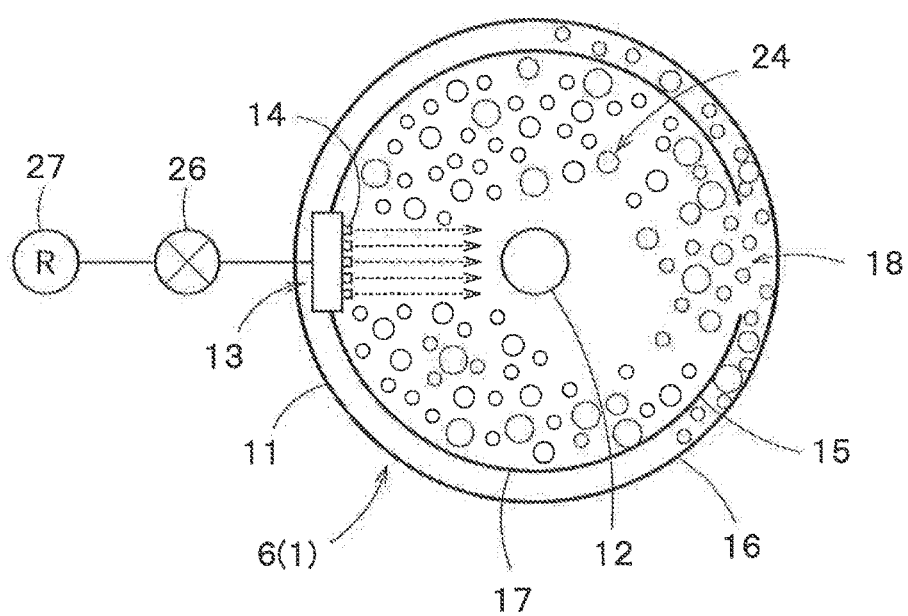
FIG. 2 is a plan view of a preparation tank when seen from above.

FIG. 2 is a plan view of the preparation tank 6 when seen from above. In the example of FIG. 2, the container 11 is cylindrical and the gas jetting port 13 is disposed on the periphery of the upper lid 22. As illustrated in FIG. 2, the gas jetting port 13 has, for example, a plurality of nozzles 14, each having a diameter of 1 mm, arranged at intervals of 1 cm. The diameter and the number of the nozzles 14 are not particularly limited. The type of the gas 25 to be jetted from the nozzles 14 is not limited, either, but the gas 25 needs to generate no chemical reaction with the chemical liquid 21. It is, therefore, desirable to choose a material of the gas 25 by considering the relationship with the type of the chemical liquid 21. Examples of the gas 25 include, for example, nitrogen, air, or an inert gas. The angle of the nozzles 14 may be set arbitrarily.

As illustrated in FIG. 2, an open/close valve 26 of the gas 25 is coupled to the nozzles 14. A pressure of the gas 25 passing through the open/close valve 26 is controlled by a pressure adjusting valve 27. The pressure adjusting valve 27 adjusts the pressure of the gas 25 in a range of, for example, 0.1 Mpa to 0.5 Mpa. The pressure of the gas 25 is made variable by a pressure adjusting valve 27 by considering that the pressure of the gas 25, which is jetted from the nozzles 14, needs to be adjusted in accordance with the type of the chemical liquid 21, the height of the liquid surface 23, the amount of the bubbles 24, or the like. The pressure adjusting valve 27 may not be provided, and the gas 25 may be jetted at a fixed pressure constantly from the nozzles 14.

As illustrated in FIGS. 1 and 2, the container 11 may have a double structure in which a bubble discharging guide (guide member) 15 is provided. The bubble discharging guide 15 has a cylindrical inner wall surface 17 provided inside an outer wall surface 16 of the container 11. The inner wall surface 17 has a notch 18 having a predetermined width and extending from the upper end portion to the lower end portion of the inner wall surface 17. The notch 18 guides the bubbles 24 generated in the container 11 to the bubble discharging guide 15. A distance between the inner wall surface 17 of the bubble discharging guide 15 and the outer wall surface 16 of the container 11 needs to be long enough to allow the bubbles 24 to smoothly move along the inner wall surface 17.

The gas jetting port 13 jets the gas 25 in such a manner that the bubbles 24 located around an irradiation position of the ultrasonic wave in the container 11 move toward the notch 18. Specifically, the direction in which the gas 25 is jetted from the gas jetting port 13 is the same as the direction toward the notch 18 from the liquid surface 23 around the ultrasonic wave irradiation position.

As a result of this, at least some of the bubbles 24 located at the ultrasonic wave irradiation position in the container 11 pass through the notch 18 and move along the inner wall surface 17 of the bubble discharging guide 15. As illustrated in FIG. 2, the container 11 has approximately a cylindrical shape, and the inner wall surface 17 of the bubble discharging guide 15 is disposed circumferentially. The bubbles 24, therefore, having passed through the notch 18 move circumferentially along the inner wall surface 17 and decrease in size over time until the bubbles 24 are finally extinguished.

The bubble discharging guide 15 is not necessarily provided. If, however, the bubble discharging guide 15 is not provided, the bubbles 24 are pushed by the gas 25, which is jetted from the gas jetting port 13, to the wall surface of the container 11, and reflected from the wall surface. Accordingly, lots of bubbles 24 may remain near the wall surface. If an excessive amount of bubbles 24 are left, the bubbles may flow again and enter the irradiation position of the sensor 12. It is, therefore, desirable to provide a preserving area of the bubbles 24 by the bubble discharging guide 15.

When the container 11 includes the bubble discharging guide 15, the bubbles 24 are removed from the container 11 without continuously jetting the gas 25 from the gas jetting port 13. Thus, the amount and time of jetting of the gas 25 from the gas jetting port 13 are reduced, and the amount of the gas 25 to be used and the consumption of power are saved.

Thus, the container 11 has the double structure, and the bubble discharging guide 15 having the inner wall surface 17 with the notch 18 formed therein is provided inside the outer wall surface 16 of the container 11. It is possible to reduce the risk of concentration of the bubbles 24 again at the irradiation position of the ultrasonic wave.

If the amount of bubbles 24 generated in the container 11 is not very large, the bubble discharging guide 15 may not be provided. The height of the liquid surface 23 can be measured accurately by the sensor 12 so long as the gas jetting port 13 continues to blow off the bubbles 24 located on the liquid surface 23 around the ultrasonic wave irradiation position.

FIG. 3A is a graph plotting the volume of the chemical liquid in the preparation tank 6 of FIG. 1 detected by the sensor 12 according to the height of the liquid surface 23. FIG. 3B is a graph plotting the volume of the chemical liquid in the preparation tank 6 that does not include the gas jetting port 13 over time in a comparative example. The preparation tank 6 of FIG. 3B is similar to the preparation tank 6 of FIG. 3A, except that the gas jetting port 13 is not provided.

As illustrated in FIG. 3A, the height of the liquid surface 23 is measured correctly regardless of the amount of the bubbles 24 by the sensor 12 in the present embodiment, such that there is substantially no change in the volume of the detected chemical liquid. In contrast, in the preparation tank 6 of the comparative example in which the gas jetting port 13 is not provided, the sensor 12 is prevented from correctly measuring the height of the liquid surface 23 due to influence of the bubbles 24, as a result of which the detected volume of the chemical liquid changes largely.

In the above, the measurement of the height of the liquid surface of the preparation tank 6 has mainly been described, but the same is true for the supply tank 8. The height of the liquid surface is accurately measured by the sensor 12 by jetting the gas from the gas jetting port 13 provided in the supply tank 8 to blow off the bubbles.

In the example of FIG. 1, the gas jetting port 13 is provided on both of the preparation tank 6 and the supply tank 8. Alternatively, if the bubbles 24 are easily generated in one of the preparation tank 6 and the supply tank 8 and the bubbles 24 are not easily generated in the other, the gas jetting port 13 may be provided only in the tank where the bubbles 24 are easily generated. Alternatively, if the bubbles 24 are easily generated in one chemical liquid 21 in the container 11 and the bubbles 24 are not easily generated in another chemical liquid 21 in the container 11, the gas 25 may be jetted from the gas jetting port 13 only when the chemical liquid 21 in which the bubbles 24 are easily generated is stored in the container 11.

In the present embodiment, when the height of the liquid surface 23 of the chemical liquid 21 in the container 11 is measured by the sensor 12, which sends and receives ultrasonic waves, the gas 25 is jetted toward a part of the liquid surface 23 including the irradiation position of the ultrasonic wave in the container 11. It is, therefore, possible to measure the height of the liquid surface 23 to minimize the negative impact from the bubbles 24 and improve the measurement accuracy. In addition, since the height of the liquid surface 23 is correctly measured in the present embodiment, the occurrence of the situation where the operation of the chemical liquid supplying apparatus 2 is forcedly stopped due to the incorrect recognition of the sensor 12 is decreased, and the productivity of the semiconductor manufacturing apparatus 30 using chemical liquid supplying apparatus 2 is improved.

The container 11 has the double structure and includes the bubble discharging guide 15 disposed inside the outer wall surface 16 of the container 11. The bubbles 24 blown off by the gas 25 are led to the bubble discharging guide 15. It is, therefore, possible to prevent a defect that the bubbles 24 having been blown off by the gas 25 impinge on the wall surface of the container 11 and are returned to the irradiation position of the ultrasonic wave.

In the embodiment described above, the example of providing the chemical liquid tank 1 in the chemical liquid supplying apparatus 2 has been disclosed, but the chemical liquid tank 1 of the present embodiment is not limited to the one used in the chemical liquid supplying apparatus 2. For example, the chemical liquid tank 1 of the present embodiment may be used in the discharging system of the semiconductor manufacturing apparatus, or may be used in an apparatus other than the semiconductor manufacturing apparatus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A chemical liquid tank, comprising:
   a container to store chemical liquid;
   a sensor to measure a height of a liquid surface of the chemical liquid stored in the container based on a time after irradiating the chemical liquid stored in the container with an ultrasonic wave and before sensing a reflected wave reflected from the liquid surface of the chemical liquid; and
   a gas jetting port including a plurality of nozzles to jet a gas from the plurality of nozzles toward a part of the liquid surface, the part of the liquid surface comprising an irradiation position of the ultrasonic wave in the container; and
   a guide member provided inside an outer wall surface of the container and to guide bubbles generated in the container,
   wherein the sensor measures the height of the liquid surface when the bubbles generated in the container are removed from the irradiation position of the liquid surface by jetting the gas toward the part of the liquid surface.

2. The chemical liquid tank according to claim 1, wherein the outer wall surface of the container is a cylindrical shape,
   the guide member comprises a cylindrical inner wall surface disposed inside and at an interval from the outer wall surface, and
   the inner wall surface comprises a notch having a predetermined width and extending from the upper end portion to the lower end portion of the inner wall surface.

3. The chemical liquid tank according to claim 2, wherein the gas jetting port jets the gas in a manner that bubbles located in the part of the container move toward the notch.

4. The chemical liquid tank according to claim 3, wherein the guide member guides the bubbles, which have been pushed by the gas and reached the notch, along the inner wall surface.

5. The chemical liquid tank according to claim 1, wherein the gas jetted from the gas jetting port is any one of nitrogen, air, or an inert gas.

6. The chemical liquid tank according to claim 1, wherein the sensor and the gas jetting port are attached to different locations of an upper lid of the container.

7. The chemical liquid tank according to claim 1, wherein the container stores at least one type of the chemical liquid mixed with pure water, while regularly circulating the stored chemical liquid.

8. The chemical liquid tank according to claim 1, wherein the container stores the prepared chemical liquid, while regularly circulating the stored chemical liquid.

* * * * *